(12) United States Patent
Hawk et al.

(10) Patent No.: US 10,143,916 B1
(45) Date of Patent: Dec. 4, 2018

(54) FACILITATING USER VOTING FOR FUTURE GAME CONTENT IN AN ONLINE GAME

(71) Applicant: ELECTRONIC ARTS INC., Redwood City, CA (US)

(72) Inventors: Travis Hawk, San Bruno, CA (US); Daria Fluor-Scacchi, San Francisco, CA (US); Brian DeSanti, South San Francisco, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 211 days.

(21) Appl. No.: 14/156,800

(22) Filed: Jan. 16, 2014

(51) Int. Cl.
  *A63F 13/30* (2014.01)
  *G06Q 30/02* (2012.01)
  *A63F 13/00* (2014.01)

(52) U.S. Cl.
  CPC ........ *A63F 13/00* (2013.01); *A63F 2300/556* (2013.01); *A63F 2300/6009* (2013.01); *G06Q 2230/00* (2013.01)

(58) Field of Classification Search
  CPC .................................................. G07F 17/34
  See application file for complete search history.

(56) References Cited

U.S. PATENT DOCUMENTS

| | | | | |
|---|---|---|---|---|
| 5,344,326 A | * | 9/1994 | Ferris | G09B 5/06 273/429 |
| 8,133,124 B2 | | 3/2012 | Braun et al. | 473/131 |
| 2008/0082448 A1 | * | 4/2008 | Meijer | G06F 21/10 705/14.69 |
| 2008/0098417 A1 | * | 4/2008 | Hatamian | H04H 60/33 725/24 |
| 2010/0064306 A1 | | 3/2010 | Tiongson et al. | 725/24 |
| 2013/0084926 A1 | * | 4/2013 | Davis | G07F 17/32 463/1 |
| 2013/0296059 A1 | | 11/2013 | Sestak et al. | 463/42 |
| 2014/0194209 A1 | * | 7/2014 | Ziouvelou | A63F 13/12 463/42 |

OTHER PUBLICATIONS

"Ubuntu Users to Get to Vote With Their Wallets in Support of New Features" URL http://www.techdirt.com/blog/casestudies/articles/20121015/07453720705/ubuntu-users-to-get-to-vote-with-their-wallets-support-new-features.shtml [Retrieved on Dec. 11, 2013].

* cited by examiner

*Primary Examiner* — Robert T Clarke, Jr.
(74) *Attorney, Agent, or Firm* — Knobbe, Martens, Olson & Bear, LLP

(57) ABSTRACT

A system and method for facilitating user voting for potential future game content in an online game are disclosed. Multiple sets of the potential future game content may be presented to users for voting. A user vote for a given set of the potential future game content may cost an amount of voting power associated with the user. The user may earn voting power by engaging in gameplays, making in-game purchases, and/or undertaking any other game-related actions desired by the provider(s) of the online game. A set of potential future game content may be selected based on votes received from the users. In some examples, rewards may be determined for distribution to the users based on the voting for the potential future game content.

16 Claims, 5 Drawing Sheets

US 10,143,916 B1

FACILITATING USER VOTING FOR FUTURE GAME CONTENT IN AN ONLINE GAME

FIELD OF THE DISCLOSURE

This disclosure relates to facilitating user voting in an online game, the user voting being facilitated for selecting future potential game content to be provided in the online game.

BACKGROUND

Implementing gameplays for individual users in a video game based on individual users' preferences is known. For example, some conventional gaming systems may suggest a number of potential game actions to a user during a course in the video games provided by those gaming systems. Based on the suggestions, the user may be enabled by those systems to indicate preferred game actions for execution in the video games.

Obtaining crowd sourced content through external user forums is known. For examples, some systems enable users to vote on a user forum for television broadcast content which the users would like to view at a future time. Some systems enable users to vote for features for inclusion in future releases of software programs during downloading of the software programs by these users.

SUMMARY

One aspect of the disclosure relates to facilitating users to vote for potential future game content in an online game. A given user of the online game may be associated with a voting power parameter. A value of the voting power parameter may reflect an amount of voting power associated with the user in the online game. For example, a unit (or number of units) of the voting power parameter may represent a "vote." The value of the voting power parameter may be determined, for example, based on gameplays, in-game purchases, and/or any other actions related to the online game undertaken by the given user. Without limitation, the value of the voting power parameter may be incremented as some metric of game play (e.g., might, experience points, level, and/or other metrics of game play) increases. For example, a unit of the voting power parameter (e.g., a "vote") may be awarded to a user each time the metric of game play is incremented some number (e.g., 1, 5, 10, and/or other numbers) through game play. Multiple sets of potential future game content may be presented to the given user, for example, in a graphical user interface implemented on a client computing platform associated with the given user. The given user may be enabled to vote for individual ones of the multiple sets of the potential future game content to be provided in the online game at a future time. A vote cast by the user for the potential future game content may cost an amount of voting power associated with the user. A set of potential future game content may be selected based on votes received from users for the individual ones of the multiple sets of potential future game content.

In some examples, rewards may be determined based on user voting for potential future game content. In some implementations, such rewards may be distributed to users by virtue of the potential future game content voted by the users being selected. In some implementations, such rewards may be distributed to users by virtue of one or more voting milestones being breached by the users. For example, without limitation, a reward may be distributed to a user by virtue of the user breaching a threshold number of voting for potential future game content. This may gauge user interest for potential future game content for the online game. This may enhance user retention for the online game provider(s) by adapting the online game in accordance with user voting. This may enhance user experience in the online game as the users are enabled to provide input to content provided in the online game.

A system configured for facilitating user voting for potential future game content in a virtual space may include a server. The server may operate in a client/server architecture with one or more client computing platforms. The client computing platforms may be associated with the users of the virtual space. The server may be configured to execute one or more of: a game component, a user component, a potential future game content component, user vote component, future game content selection component, reward component, and/or other components.

The game components may be configured to execute an instance of an online game. The game component may facilitate user interaction within the online game by receiving user commands from client computing platforms associated with the users of the online game. Within the instance of the online game executed by the game component, the users may participate in the instance of the virtual space by controlling one or more of an element in the virtual space. The users may input commands with specific parameters to undertake specific deeds, actions, functions, spheres of actions and/or any other types of interactions within the online game.

The user component may be configured to manage user accounts associated with the individual users. The user account associated with a given user as managed by the user component may comprise one or more user parameters related to the given user. The one or more user parameters may include a voting power parameter and/or any other parameter(s). For the given user, a value of the voting power parameter may reflect an amount of voting power associated with the given user in the online game. The voting power may be used or consumed by the given user, for example, for voting for potential future game content and/or for any other purposes related to the online game. The value of the voting power parameter may be determined based on gameplay, in-game purchases, and/or any other actions related to the online game undertaken by the given user. In some examples, voting power may be earned by the given user in the online game for engaging in gameplays, actions, activities, events and/or any other deeds desired by the provider, administrator, moderator, and/or any other entities related to the online game. The user accounts managed by the user component may include a first user account associated with a first user. The first user account may comprise a voting power parameter having a value reflecting an amount of voting power associated with the first user in the online game.

The potential future game content component may be configured to effectuate presentation to users of the online game of information related to multiple different sets of potential future game content for the online game. A given set of potential future game content presented may include game features, game mechanics, characters, plots, virtual items, difficulty level, quests, missions, campaign, maps, virtual areas for interaction and/or any other types of game content that may be provided in the online game at a future time. Information related to such a set of potential future game content may be obtained dynamically by the potential future game content component, for example, via a graphical user interface and/or any other types of interfaces accessible to the provider(s), administrator(s), developer(s), and/or any other entity related to operations of the online game. Information related to the multiple different sets of potential future game content may be presented to the users in a graphical user interface implemented on client computing platform associated with the users.

The user vote component may be configured to receive entry and/or selection of user votes for individual ones of the sets of potential future game content. A user vote for a potential future game content may be received from the client computing platform associated with a user. The received user vote may cost an amount of voting power associated with the user as reflected by the voting power parameter for the user. In some examples, such a voting power cost may be predetermined by the provider, administrator, moderator, and/or any other entities related to the online game. In some examples, the voting power cost may be dynamically determined during runtime of the system. In some examples, the voting power cost may be fixed with respect to any given set of potential future game content presented to the user by the potential future game content component. In some examples, the voting power cost may be dynamically determined based on one or more user parameters associated with the user, game content parameters, and/or any other parameters. In some examples, multiple sets of future game content presented to the user may cost the same amount of voting power; and in some other examples, they may cost a different amount of voting power.

In some implementations, the user vote component may be configured to enable users to allocate individual quantities of votes to the individual sets of potential future game content presented to the users. For example, a user may be enabled to allocate a quantity of votes to a set of potential future game content desired by the user. The quantity of votes the user may allocate to such a set of potential future game content may be determined based on the voting power associated with the user—as reflected by the value of the voting power parameter, a maximum number of votes that may be allocated as determined by provider, administrator, moderator, and/or any other entities related to the online game, and/or based on any other parameters. In some examples, a user may be enabled to vote for more than one set of potential future game content out of the multiple sets of potential future game content presented. In those examples, the user may be enabled to allocate individual quantities of votes corresponding to the sets of potential future game content selected by the user.

The future game content selection component may be configured to select one or more sets of potential future game content based on the user votes received by the user vote component. This may involve tallying the received user votes. In some examples, the selection by the future game content selection component include determining the highest number of user votes received for a set of potential future game content as compared to user votes received for other sets of potential future game content.

The reward component may be configured to determine rewards for distribution to individual users of the online game. The reward determination by the reward component may be based on a set of future potential game content voted by a given user being selected by the future game content selection component. In some examples, the size or magnitude of a reward determined by the reward component for a given user may be based on a quantity of votes allocated by the given user to the set of future potential game content, and/or based on any other parameters. In some examples, the reward determination by the reward component may be based on a voting milestone being breached by the given user. For example, such a voting milestone may specify a threshold number of voting for potential future game content to be performed by the given user. The reward determined by the reward component may include virtual items, virtual currencies, real-world money credit, and/or any other types of reward.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
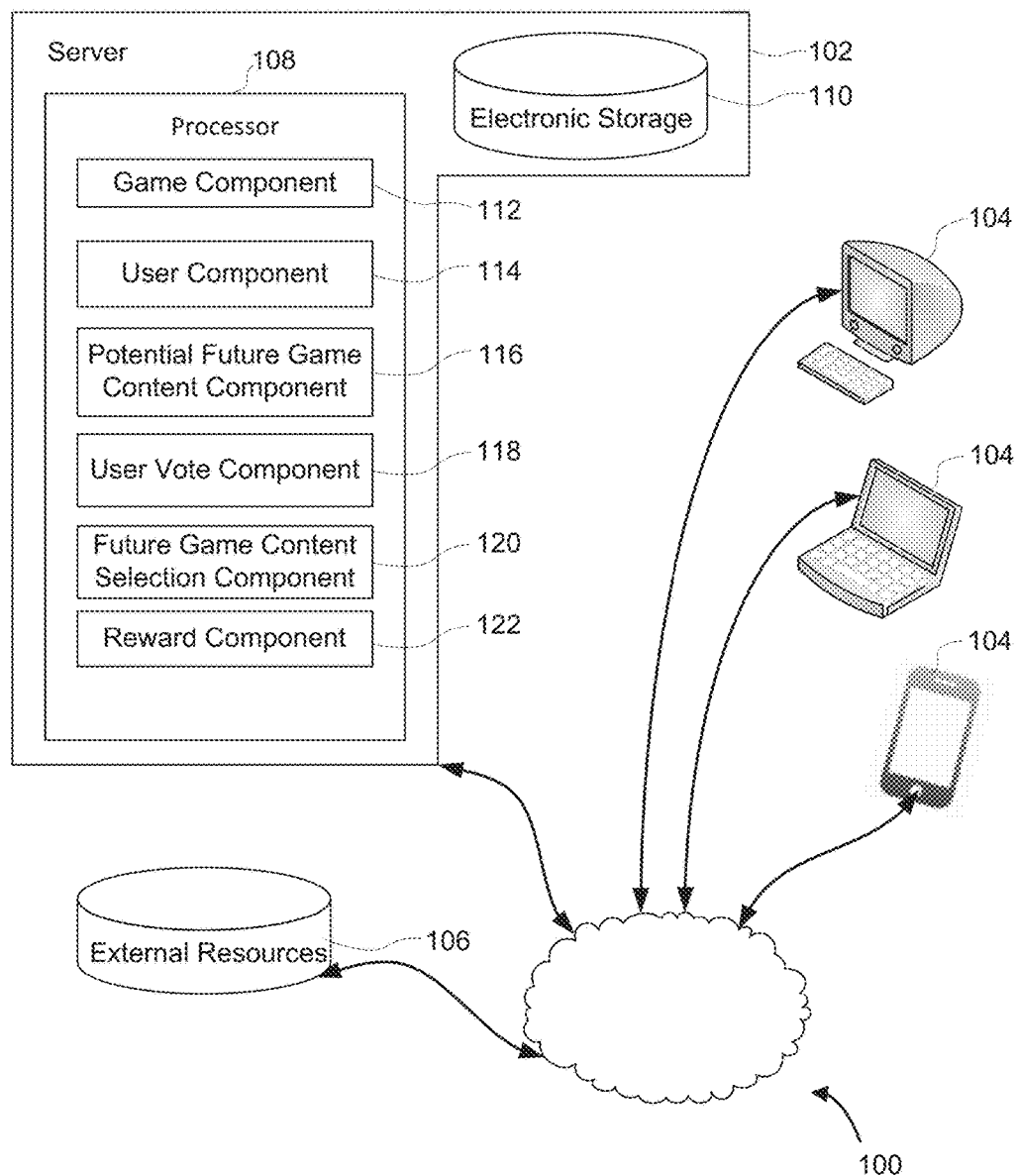
FIG. 1 illustrates a system for facilitating user voting for future game content in an online game.

FIG. 1 illustrates a system 100 for facilitating user voting for potential future game content in an online game. Providing the virtual space may include hosting the virtual space over a network. In some implementations, system 100 may include a server 102. The server 102 may be configured to communicate with one or more client computing platforms 104 according to a client/server architecture. The users may access system 100 and/or the virtual space via client computing platforms 104. The server 102 may comprise a processor 108 configured to execute computer readable instructions to implement system components. The computer program components may include one or more of a game component 112, a user component 114, a notification generation component 116, a notification frequency determination component 118, a future game content selection component 120, and/or other components.

The game component 112 may be configured to execute an instance of an online game. Within the instance of the online game, the users may interact with elements in the online game and/or with each other through gameplays provided by the online game. The gameplays may include role-playing, first-person shooter, real-time strategy, turn-based strategy, simulation, music or rhythm playing, social interaction, twitching and/or any other gameplays. The execution of the instance of the online game by game component 112 may include determining the state communicated (e.g., via streaming visual data, via object/position data, and/or other state information) from server 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in a virtual space associated with the online game. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the online game may be persistent. That is, the online game may continue on whether or not individual users are currently logged in and/or participating in the online game. A user that logs out of the online game and then logs back in some time later may find the virtual space associated with the online game has been changed through the interactions of other users with the virtual space during the time the user was logged out. These changes may include changes to the simulated physical space, changes in the user's inventory, changes in other users' inventories, changes experienced by non-user characters, and/or other changes.

The instance of the online game may comprise a simulated virtual space that is accessible by users via clients (e.g., client computing platforms 104) that present the views of the virtual space to a user. The simulated virtual space may have a topography, express ongoing real-time interaction by one or more users, and/or include one or more objects positioned within the topography that are capable of locomotion within the topography. In some instances, the topography may be a two-dimensional topography. In other instances, the topography may be a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the online game may comprise virtual space entities automatically controlled in the instance of the online game. Such virtual space entities may not be associated with any user. As such, the automatically controlled virtual space entities may be generated and/or developed by artificial intelligence configured with the server 102 by a provider, administrator, moderator, and/or any other entities related to the online game. These automatically controlled entities may evolve within the virtual space associated with the online game free from user controls and may interact with the entities controlled by or associated with the users, other automatically controlled virtual space entities, as well as the topography of the virtual space. Certain manifested traits may be associated with the automatically controlled entities in accordance with the artificial intelligence configured with the server 102. As used herein, such automatically controlled virtual space entities in the instance of the online game are referred to as "AI entities".

The above description of the manner in which state of the virtual space associated with the online game as determined by game component 112 is not intended to be limiting. The game component 112 may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance of the online game executed by game component 112, the users may participate in the instance of the online game by controlling one or more of an element in the virtual space associated with the online game. The user-controlled elements may include avatars, virtual space characters, virtual space units (e.g., troops), objects (e.g., weapons, horses, vehicle and so on), simulated physical phenomena (e.g., wind, rain, earthquakes, and/or other phenomena), and/or other user-controlled elements. The user-controlled avatars may represent the users in the virtual space. The user characters may include heroes, knights, commanders, leaders, generals and/or any other virtual space entities that may possess strength, skills, abilities, magic powers, knowledge, and/or any other individualized attributes. The virtual space units controlled by the user may include troops and/or any other virtual space entities that may be trained, recruited, captured, and/or otherwise acquired by the users in groups or en mass. The objects controlled by the users may include weapons, vehicles, projectiles, magic items, wardrobes, boots, armor, knapsacks, medicine, healing potion, and/or any other virtual items that may be employed by the users for interaction within the online game.

In any case, the user-controlled elements may move through and interact with the virtual space (e.g., AI entities, elements controlled by other users and/or topography in the virtual space) associated with the online game. The elements controlled by a given user may be created and/or customized by the given user. The given user may have an "inventory" of virtual goods and/or currency usable within the virtual space associated with the online game.

Within the virtual space associated with the instance of the online game executed by game component 112, resources may be, for example, generated, cultivated, prospected, mined, harvested, purchased, earned, traded and/or gifted over time by units, characters, pets, buildings, facilities and/or any other infrastructure or entities in the virtual space for a given user. Resources may include virtual items that are accumulated en masse and then used to satisfy resource requirements in the virtual space. By way of non-limiting examples, virtual space resources may include food (e.g., rice, fish, wheat, etc.), wood, minerals (e.g., good, iron, ore, coal, oil, stone, crystal, etc.), plants, animals, virtual items, virtual currencies, and/or any other resources appropriate for the virtual space. Transfer of resources between users may be reflected through user inventories Controls of virtual elements may be exercised through commands input by a given user through client computing platforms 104. The given user may interact with other users through communications exchanged within the virtual space associated with the online game. Such communications may include one or more of textual chat, instant messages, private messages, voice communications, and/or other communications. Communications may be received and entered by the users via their respective client computing platforms 104. Communications may be routed to and from the appropriate users through server 102 (e.g., through game component 112).

A given user may input commands with specific parameters to undertake specific deeds, actions, functions, sphere of actions and/or any other types of interactions within the virtual space. For example, the given user may input commands to construct, upgrade and/or demolish virtual buildings; harvest and/or gather virtual resources; heal virtual user-controlled elements, AI entities and/or elements controlled by other users; train, march, transport, reinforce, reassign, recruit, and/or arrange troops; attack, manage, create, demolish and/or defend cities, realms, kingdoms, and/or any other virtual space locations controlled by or associated with the users; craft or transport virtual items; interact with, compete against or along with AI entities and/or virtual space elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the virtual space. In some examples, the given user may input commands to compete against elements in an environment within the virtual space—i.e., Player vs. Environment (PvE) activities. In some examples, the given user may input commands to compete against each other within the virtual space—i.e., Player vs. Player (PvP) activities.

The game component 112 may be configured to execute user actions to facilitate interaction of the users with the online game and/or each other in response to receiving virtual space commands input by the users. Execution of the user action by the game component 112 may produce changes to the game state, which may reflect progresses and/or results of the user actions. In some examples, state changes caused by the execution of the user actions may be recorded in the electronic storage 110 to facilitate persistency throughout the instance of the online game. In some examples, execution of the user actions may not produce persistent changes to the game state (e.g., a user character jumping forward and backward successively may not produce any perceivable game state changes to other users).

The user actions executed by the game component 112 may include combat actions enabling users to direct user entities to compete against AI entities and/or against elements controlled by other users in combats. The combat actions may include real-time combat actions through which the users may direct user entities (e.g., avatars) to perform maneuvers in real or near-real time; may include turn-based combat actions through which the users may direct user entities (e.g., user character, troops and/or combat equipment) to inflict damages and/or resist damages; may include strategy combat actions through which the users may position the user entities strategically in combats; and/or may include any other types of combat actions.

Within the virtual space associated with the instance of the online game, the users may control locations to generate revenues, productions, resources, troops, culture, wonders, special units and/or any other types of output enabled by the virtual space locations controlled by the users. The user-controlled locations may include virtual space towns, cities, kingdoms, castles, villages, fortresses, landmasses, resource cores, and/or any other types of virtual space locations. Typically, through controlling such virtual locations, the users may grow populations, construct infrastructures, conduct commerce, collect taxes, raise troops, train special units, train knights and/or any other user characters, research technologies, gain skills and/or abilities, and/or undertake any other actions, functions, deeds, or sphere of actions as enabled by such virtual space locations. For example, a given user may control multiple cities in the virtual space and the cities may generate revenues to fund the given user activities within the virtual space; may generate troops; may generate growth in science; may produce weapons; may generate production; may produce food and so on.

The users may control resource cores in the virtual space associated with the instance of the online game executed by the game component 112. A resource core is a type of virtual space object that may provide specific raw materials, resources, currencies, substances, and/or any other virtual space elements when harvesting actions are performed by user characters with proper skills, equipment, gears, formulas, time duration, and/or any other harvesting parameters. Resource cores may or may not be visible to the users, depending on the users' skills. Resource cores may be depleted due to harvesting actions by users and in some examples may be destroyed in the virtual space associated with the online game. In some examples, new resource cores may be created to replace the destroyed ones in the virtual space at times determined by the provider, administrator, moderator, and/or any other entities related to the virtual space. Examples of resource cores may include mines, rivers, wells, oceans, swamps, mountains, forests, boxes, pets, plants, and/or any other virtual space locations or objects.

Within the instance of the online game executed by the game component 112, levels may be established to facilitate and/or incentivize user advancements. Users may receive virtual points for performing actions, participating in virtual space activities, interacting with virtual space elements and/or other users, and/or for engaging in any other interactions provided by the virtual space. A user may advance to a next level when a certain goal has been reached, an end condition has been fulfilled by the user in the online game, and/or the points acquired by the user have reached a threshold corresponding to the next level. Advancements in user levels typically result in attribute boosts, skill boosts, resistance boosts, higher status, and/or any other types of user progression in the virtual space. In some examples, for different categories of gameplays, skills, abilities, and/or any other areas that may be progressed by users, different levels may be established. For example, experience levels may be established in the online game to reflect overall experiences of the users, levels in certain skills may be established to reflect user progressions in acquiring or mastering these skills in the online game, and so on.

The user component 114 may be configured to manage user accounts associated with the individual users. The user accounts may comprise one or more user profiles and/or user information stored by server 102, one or more of the client computing platforms 104, and/or other storage locations. The user information associated with a given user may comprise one or more user parameters related to the given user. The one or more user parameters may include a voting power parameter and/or any other parameter(s). A value of the voting power parameter may reflect an amount of voting power associated with the given user in the online game. In some examples, the value of the voting power parameter may be presented through representation of "votes", "voting points", and/or other units of voting power. For example, the given user may be associated with X number of "votes" available for the given user to cast in the online game. However, it should be understood this is not intended to be limiting. Other examples of voting power representation are contemplated. For example, the value of the voting power parameter may be represented through a graphical bar and the length of the graphical bar may reflect the amount of the voting power associated with the given user; may be represented through stars or other graphical objects and the number of stars or other graphical objects may reflect the amount of the voting power associated with the given user; or may be represented through any other type of representation.

The voting power indicated by the voting power parameter for the given user may be used or consumed by the given user in the online game for various purposes. Example of such purposes may include voting for one or more virtual items customized by users of the online game, voting for an electorate (e.g., an alliance leader) in the online game, voting for potential future game content for implementation in the online game, and/or any other purposes. The voting power may be consumed by the given user such that casting a vote in the online game for the individual ones of potential future game content may cost an amount of the voting power associated with the given user. That is, in order for the given user to cast a vote for potential future game content to be provided in the online game, an amount of voting power associated with the given user may be reduced. In implementations, such voting power reduction may be reflected through reduction of the value of the voting power parameter. By way of non-limiting example, without limitation, the voting power parameter for the given user may have a value of 100 "voting points"; and a number of "voting points", say 10 "voting points", may be consumed for casting a vote for a set of potential future game content desired by the given user. As will be illustrated with further details, in some examples, the users of the online game may be enabled to allocate votes for the potential future game content desired by the give user. For example, the given user in those examples may allocate a number of "voting points" to a set of potential future game content desired by the given user.

The value of the voting power parameter may be determined based on, for example, gameplay, in-game purchases, quests completed, online game activities participated in and/or any other user actions related to the online game undertaken by the given user. For example, the given user may earn a quantity of voting power by engaging in a gameplay desired by the provider(s) of the online game; and the value of the voting power parameter may be incremented as some metric of game play (e.g., might, experience points, level, and/or other metrics of game play) increases. In one embodiment, a unit of the voting power parameter (e.g., a "vote") may be awarded to a user each time the metric of game play is incremented some number (e.g., 1, 5, 10, and/or other numbers) through game play. In one embodiment, a user may earn a number of "voting points" by training troops in the virtual space associated with the online game. Other gameplays based on which the value of the voting power is determined may include building upgrades, user character development, interactions with the other user characters in the virtual space, interactions with the virtual space by the given user, and/or any other types of gameplays. This may help the provider(s) of the online game to distribute voting power to users based on gameplays desired. In this way, the desired gameplays engaged in by the given user may be reflected through the value of voting power parameter for the given user. As will be described later, the voting power associated with the given user may help the provider(s) of the online game select a set of potential future game content to be provided in the online game at a future time.

In some examples, the given user may earn a quantity of voting power for making certain in-game purchases. For example, user in-game purchases of virtual items desired by the provider(s) of the online game may result in voting power being distributed to the users making such in-game purchases. In another example, in-game purchases over a certain threshold amount of virtual currencies may earn the users making such in-game purchases a corresponding amount of voting power. By way of non-limiting example, without limitation, in one embodiment, a given user may earn X amount of voting power by virtue of making an in-game purchase in one transaction for over Y amount of the virtual currency.

The user information may include information related to purchases or spending by the given user in or for the virtual space. Such spending information may include, for example, purchase information for individual transactions, a spend rate, a total spend amount, and/or other information related to user purchases. The spending information associated with a given user may indicate a level of spending by the given user within the virtual space, for example, without limitation, lifetime spending (total spending by the given user in the virtual space), average spending during certain predetermined periods (e.g., spending by the given user during Thanksgiving, Christmas and/or any other periods), spending by the given user during certain events within the virtual space (e.g., spending by the given user during a specific tournament, quest, contest, and/or any other types of virtual space events), and any other spending information by the given user.

The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users. The user information managed by the user component 114 may include information indicating levels of interaction with the virtual space by individual users. The interaction level of an individual user as indicated in such information may reflect an amount of interaction with the virtual space by the individual user.

Figure 2:
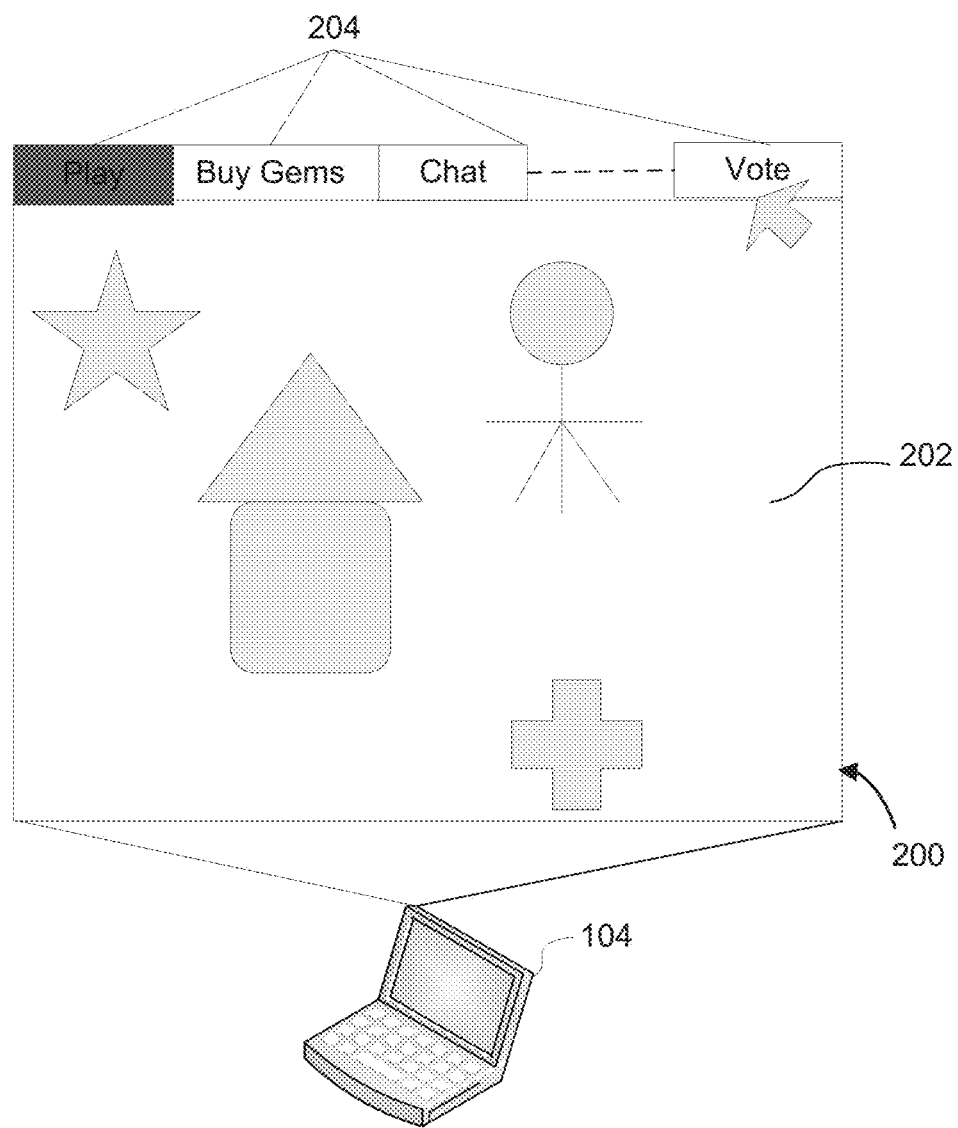
FIG. 2 illustrates one example of an instance of an online game presented to a user in accordance with the disclosure.

FIG. 2 illustrates one example of an instance of an online game presented to a user in accordance with the disclosure.

As can be seen in this example, a graphical user interface 200 may be presented on a client computing platform 104 associated with a given user of the online game. The graphical user interface 200 may enable the given user to interact with a virtual space 202 associated with the online game as shown. It should be appreciated that in some examples, the graphical user interface 200 may occupy the entire display associated with the client computing platform 104 as a stand along interface for such interaction; and in some other examples, the graphical user interface 200 may be a portion of some other graphical user interface(s)—e.g., a graphical user interface of social media. As illustrated in this example, tabs 204 may be provided in the graphical user interface 200 to enable users to switch between different views of the graphical user interface 200 as shown. As can be seen, the tabs 204 may include a "vote" tab to enable the given user to switch to a view in which potential future game content may be presented.

Returning to FIG. 1, the potential future game content component 116 may be configured to effectuate presentation to users of information related to multiple different sets of potential future game content for the online game. The multiple sets of potential future game content may be presented to users for voting such that one or more of the multiple sets of potential future game content presented may be provided in the online game at a future time. A given set of potential future game content whose presentation is effectuated by potential future game content component 116 may include game features, game mechanics, characters, plots, virtual items, difficulty level, quests, missions, campaign, maps, virtual areas for interaction and/or any other types of game content that may be provided in the online game at a future time. Information related to such a set of potential future game content may include information indicating a description (including text, video, and/or audio), graphical representation of the corresponding potential future game content (e.g., image, video, animation, 3D graphics and/or any other graphic format), user comments, reviews by users and/or critics, up-votes received from other users, and/or any other types of information related to the set of the potential future game content.

In some examples, the multiple sets of potential future game content may be determined by the provider(s) of the online game for presentation on the client computing platform 104. By way of non-limiting example, without limitation, in one embodiment, user behaviors within the online game may be monitored by the provider(s) or the personnel of the provider(s) of the online game; and potential future game content may be determined based on the monitored user behaviors in the online game. For instance, if a majority of users engage in a particular type of gameplay with high frequencies, a set of potential future game content involving this particular type of gameplay may be determined for presentation to the users. In some examples, the multiple sets of potential future game content may be determined dynamically at least in part in accordance with one or more metrics established, for example by the provider, administrator, moderator, and/or any other entities related to the online game. In one example, the potential future game content (e.g., a potential quest) may be determined automatically by the potential future game content component 116 using one or more metrics (e.g., a threshold number of users have reached a level in the online game to play the potential mission) configured with potential future game content component 116.

In any case, the potential future game content component 116 may be configured to obtain the information related to the multiple sets of potential future game content for presentation on the client computing platforms 104. In some implementations, information related to a set of potential future game content may be obtained dynamically by the potential future game content component 116, for example via a graphical user interface and/or any other types of interfaces accessible to the provider(s), administrator(s), developer(s), and/or any other entity related to operations of the online game. In those implementations, such information may be provided by the provider, administrator, moderator, and/or any other entities related to the online game through the graphical user interface. In some other implementations, the potential future game content component 116 may be configured to generate such information based on parameters of the multiple sets of future potential game content for presentation. For example, without limitation, a description of a given set of future potential game content for presentation may be generated by potential future game content component 116 based on a plot associated with the given set of future potential game content automatically (e.g., first 50 words of the plot). In some examples, the information may be obtained by potential future game content component 116 from external resources 106. For instance, the information may be obtained from external resources 106 associated with an online social media operator affiliated with the online game.

The user vote component 118 may be configured to receive entry and/or selection of user votes for individual ones of the sets of potential future game content. A user vote for a set of potential future game content may be received from the client computing platform 104 associated with a user. The received user vote may cost an amount of voting power associated with the user as reflected by the voting power parameter for the user. In some examples, such a voting power cost may be predetermined by the provider, administrator, moderator, and/or any other entities related to the online game. For example, without limitation, the provider(s) of the online game may determine voting for individual sets of future game content by a given user may cost X amount of voting power associated with the given user. In some examples, the voting power cost may be dynamically determined during runtime of the system, for example, at least in part in accordance with one or more rules, metrics, logic, and/or any other types of programed constructs configured with user vote component 118. For example, without limitation, the voting power cost may be dynamically determined based on a number of users that have cast votes for the multiple sets of potential future game content in the online game. As an illustration, in that example, the less users that have cast such votes in a given period, the less amount of voting power cost may be determined by the user vote component 118. Other examples of determining voting power cost dynamically are contemplated.

Figure 3:
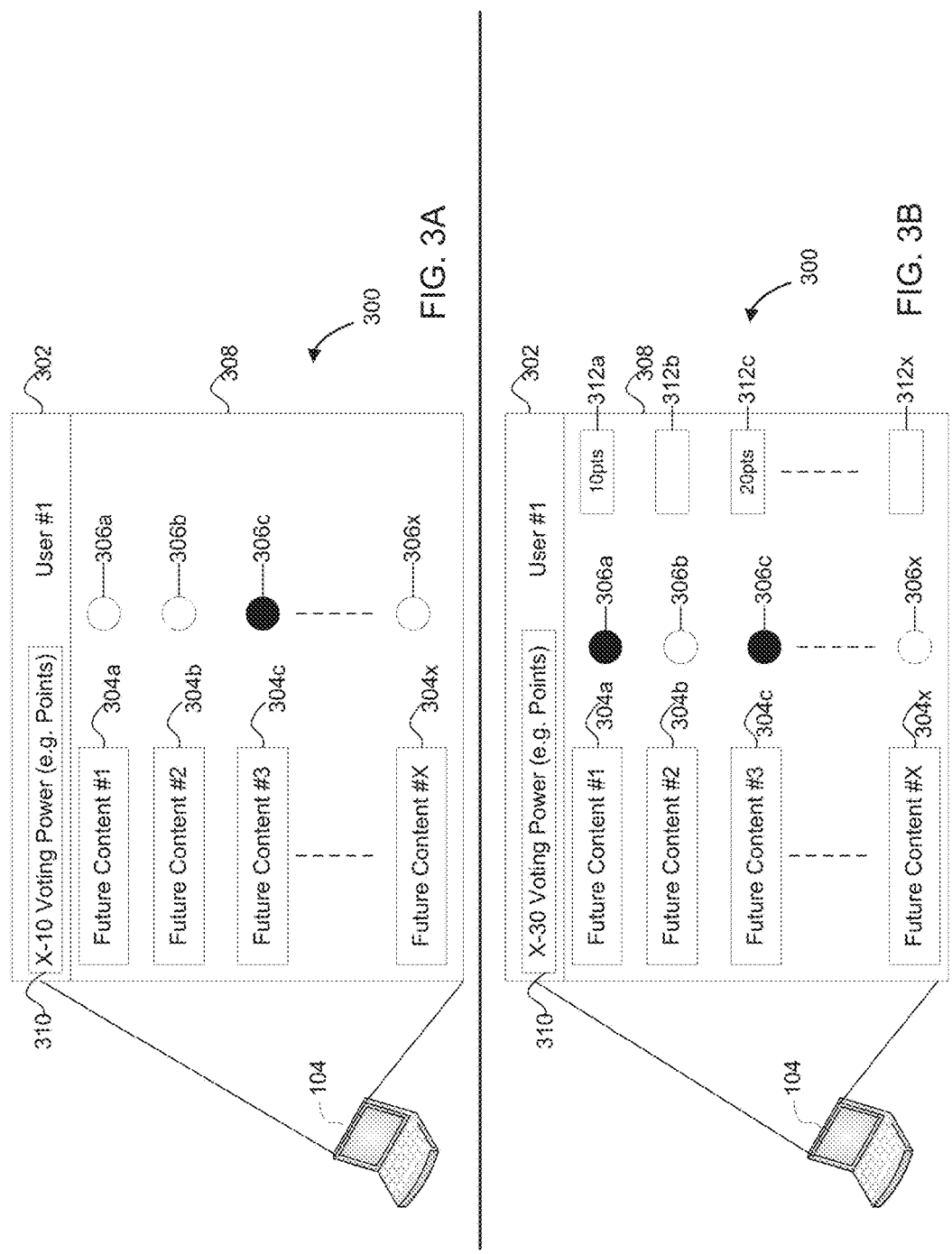
FIG. 3A illustrates one example of a graphical user interface implemented on a client computing platform for presenting multiple sets of potential future game content for user voting.
FIG. 3B illustrates another example of a graphical user interface implemented on a client computing platform 104 for presenting multiple sets of potential future game content in accordance with the disclosure.

FIG. 3A illustrates one example of a graphical user interface implemented on a client computing platform for presenting multiple sets of potential future game content for user voting. As shown, the graphical user interface 300 may be implemented on a client computing platform 104. The graphical user interface 300 as illustrated may constitute some or all of a view of the voting tab 204 shown in FIG. 2. In this example, the graphical user interface 300 comprises an information bar 302 and a presentation panel 308. As shown, the presentation panel 308 may present information 304 related to multiple sets of potential future game content described above. As also shown, the presentation panel 308, in this example, comprises selection controls

306a, 306b, and 306x enabling users to vote for individual ones of the multiple sets of the potential future game content. In this example, as illustrated, the potential future game content set #3 304c is voted by a user, e.g., user 1 in this example, via the graphical user interface 300. This indicates that user 1 desires the online game to provide the future game content set #3 at a future time (e.g., next release of the online game or next upgrade of the online game).

As described above, casting a vote in the online game may cost an amount of voting power associated with the user that casts the vote. This is illustrated in FIG. 3A. In this example, casting a vote for a set of future game content may cost the user a predetermined amount of voting power—in this example, "voting points". This predetermined amount of voting power cost may be fixed across the individual ones of the multiple sets of the potential future game content 304. In this example, such a cost is 10 voting points as reflected by the voting power information field 310 such that the voting points associated with the user, e.g., user 1, is reduced by 10 points upon the user casting one vote for potential future game content set, e.g., the potential future game content set #3, through the selection control 306c. However, it should be understood this is merely illustrative. In some other examples, the voting power cost for the future game content sets may vary. For example, potential future game content sets that are more sophisticated (e.g., involving more gameplays) may cost more voting power than those that are less sophisticated. It should be appreciated that the voting power cost may be predetermined by provider, administrator, moderator, and/or any other entities related to the online game in some examples; and in some other examples, such a cost may be determined dynamically based on its desirability, popularity, and/or any other relevant factors.

FIG. 3B illustrates another example of a graphical user interface implemented on a client computing platform 104 for presenting multiple sets of potential future game content in accordance with the disclosure. In this example, as shown, a user, e.g., user 1, is enabled to vote for more than one set of potential future game content desired by the user. As shown, the graphical user interface 300 may enable the user to allocate an amount of votes to be associated with the future game content set 304. The quantity of votes the user may allocate may be determined based on the voting power associated with the user, a maximum number of votes that may be allocated as determined by provider, administrator, moderator, and/or any other entities related to the online game, and/or based on any other parameters. As will be described later, the amount of votes allocated by the user may be used for selecting future game content to be provided in the online game, for determining rewards to be distributed to the user, and/or for any other purposes. In this example, as shown, the user votes for future game content set #1 304a and allocates 10 voting points via vote allocation entry control 312a; and votes for future game content set #3 304c and allocates 20 voting points to the vote via vote allocation entry control 312c. As shown, such allocation results in the voting power associated with the user being reduced by 30 points as indicated by the vote power information filed 310.

Returning to FIG. 1, the future game content selection component 120 may be configured to select one or more sets of potential future game content based on the user votes received by user vote component 118. For the multiple sets of the potential future game content presented to the users as illustrated in FIGS. 3A-B, the received user votes may be tallied by the future game content selection component 120. In some examples, as described above in FIG. 3A, a given user may cast one vote for a set of potential future game content desired by the given user to be provided in the online game at a future time. In those examples, a number of user votes corresponding to the set of potential future game content may reflect a number of users that voted for that set of potential future game content. As an illustration, in those examples, if the set of potential future game content receives 50 votes, that means 50 individual users voted for that set of potential future game content.

In some other examples, as illustrated above in FIG. 3B, a given user may cast more than one vote for a set of potential future game content. For example, the given user may allocate a quantity of voting power—e.g., "voting points"—to a set of potential future game content. The future game content selection component 120 may tally the votes based on the "voting points" allocated by the users. For instance, if a user allocates 10 voting points to a set of potential future game content, the future game content selection component 120 may tally 10 votes for that set of potential future game content. However, this is not intended to be limiting. Other methods of tallying votes for potential future game content based on voting power allocated are contemplated. For example, in one instance, a weight factor may be employed to magnify the voting power allocated by users for the potential future game content sets voted by the user such that the more voting power allocated by the users for potential future game content set, the better result the user may achieve. This may encourage users to allocate sizeable amounts of voting power for the potential future game content sets desired by the users.

Figure 4:
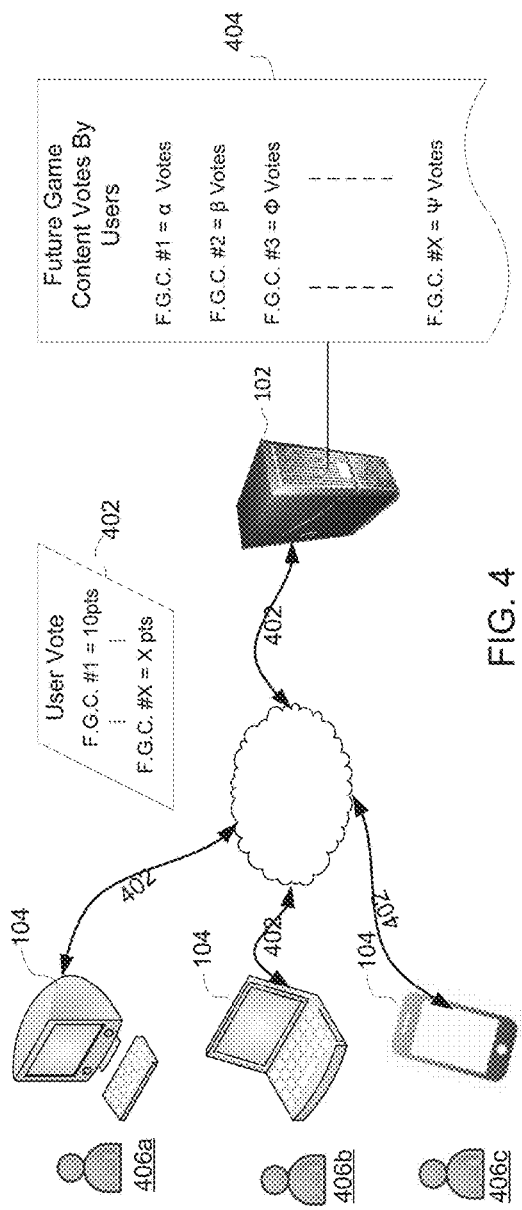
FIG. 4 illustrates one example of selecting a set of potential future game content based on received user votes in accordance with the disclosure.

FIG. 4 illustrates one example of selecting a set of potential future game content based on received user votes in accordance with the disclosure. As shown in this example, user votes 402 for one or more sets of potential future game content may be received by server 102 from the client computing platforms 104 associated with individual users 406a, 406b, 406c. As shown, a given user may cast votes 402 for one or more sets of potential future game content desired by the given user. As illustrated in this example, an amount of voting power may be allocated to a user vote 402 corresponding to a set of potential future game content. As shown, based on the received user votes 402, server 102 may, for example, tally the received votes for individual sets of potential future game content via the future game content selection component 120. The result 404 of such accounting by the server 102 is illustrated. As can be seen from the result 404, individual sets of potential future game content may receive a corresponding number of votes. Based on such corresponding number of votes, the server 102 may, e.g., via the future game content selection component 120, select a set of potential future game content to be provided in the online game (e.g., the set of potential future game content that receives highest number of votes).

Returning to FIG. 1, the reward component 122 may be configured to determine rewards for distribution to the individual users. The reward determination by the reward component may be based on a set of future potential game content voted by a given user being selected by the future game content selection component. For example, without limitation, if a set of potential future game content voted by the user is selected by the future game content selection component 120, the reward component 122 may determine a reward for the given user. The reward determined by the reward component 122 may include one or more virtual items usable in the online game (e.g., a weapon, a piece of armor, a scroll, and/or any other types of virtual item), virtual currencies, virtual resources, real-world money credit, and/or any other types of rewards. This may reward the users that voted for the selected game content. The reward may be determined based on the amount of voting power expended by a user on the selected game content (e.g., the number of votes for the selected game content).

In some examples, the reward determination by the reward component 122 may be based on a quantity of votes allocated by a given user to a set of potential future game content selected by the future game content selection component 120. For example, as an illustration, a reward of a first amount of virtual currencies, say 5 coins, may be determined for a first user wherein the first user allocated 10 voting points to the set of potential future game content selected by the future game content selection component 120; and a reward of a second amount of virtual currencies, say 10 coins may be determined for a second user wherein the second user allocated 20 voting points to the set of potential future game content selected by the future game content selection component 120.

In some examples, the reward determination by the reward component 122 may be based on a voting milestone being breached by the given user. For example, such a voting milestone may specify a threshold number of voting for potential future game content to be performed by the given user. As an illustration, in one embodiment, the voting milestone may specify a user may be rewarded after the user has participated in voting for potential future game content for more than 5 times. In that embodiment, a reward may be determined after the user has participated in voting for potential future game content for more than 5 times. This may motivate users to participate in voting for potential future game content frequently in the online game.

In some examples, the rewards determined by the reward component 122 may include access to some portion or all of a given set of potential future game content voted by the users and selected by the future game content selection component 120. In those examples, the reward component 122 may determine a number of users—e.g., winners that may receive such rewards. The winners may be determined from users that voted for the given set of potential future game content. In some embodiments, the determination of such winners by reward component 122 may be based, at least in part, on a quasi-stochastic or stochastic selection. In some embodiments, users that voted more frequently during a period and/or cast more votes for the given set of potential future game content may have more chance than other users to be determined as winners by the reward component 122.

By way of non-limiting example, without limitation, in one embodiment, a set of potential future game content voted by users and selected by the future game content selection component 120 may include a new type of buildings for training a new type of troops (e.g., a new Green Beret training facility that trains commandos). The reward component 122 may determine, in that example, a number of winners, say 10 to receive a building of this new type when it is provided in the online game. The reward component 122 may determine these 10 winners from the users that voted for this new type of building to be provided in the online game during a period desired by the provider(s) of the online game. In that example, the reward component 122 may determine the winners based on number of votes cast by those users for the new building type, number of times for which those user voted for the new building type during the period, a stochastic factor, and/or any other factor(s).

Figure 5:
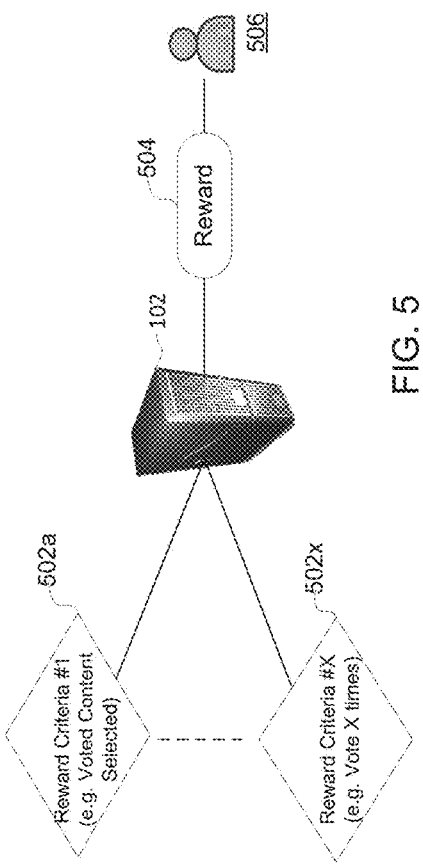
FIG. 5 illustrates one example determining a reward for distribution to a user in accordance with the disclosure.

FIG. 5 illustrates one example determining a reward for distribution to a user in accordance with the disclosure. As shown, one or more reward criteria 502a, 502b, 502x may be configured with server 102, for example via the reward component 122. As illustrated, the reward criteria 502a, 502b, 502x may include a criteria that specifies a reward may be distributed to a user if the user has voted for a set of potential future game content selected by the server 102 (e.g., via the future game content selection component 120), a criteria that specifies a reward may be distributed to a user if the user has voted for potential future game content to be provided in the online game for more than a threshold (e.g., 5 times), and/or any other types of reward criteria. As can be seen, based on one or more reward criteria 502a, 502b, 502x, the server 102, for example, may determine a reward 504 for distribution to the user 506 via the reward component 122.

The server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program components. The computer program components may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a FireWire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute components 112, 114, 116, 118, 120, 122. Processor 108 may be configured to execute components 112, 114, 116, 118, 120, 122 by software; hardware; firmware; some combination of software, hardware, and/or firmware; and/or other mechanisms for configuring processing capabilities on processor 108.

It should be appreciated that although components 112, 114, 116, 118, 120, 122 are illustrated in FIG. 1 as being co-located within a single processing unit, in implementations in which processor 108 includes multiple processing units, one or more of components 112, 114, 116, 118, 120, 122 may be located remotely from the other components. The description of the functionality provided by the different components 112, 114, 116, 118, 120, 122 described below is for illustrative purposes, and is not intended to be limiting, as any of components 112, 114, 116, 118, 120, 122 may provide more or less functionality than is described. For example, one or more of components 112, 114, 116, 118, 120, 122 may be eliminated, and some or all of its functionality may be provided by other ones of components 112, 114, 116, 118, 120, 122. As another example, processor 108 may be configured to execute one or more additional components that may perform some or all of the functionality attributed below to one of components 112, 114, 116, 118, 120, 122.

Figure 6:
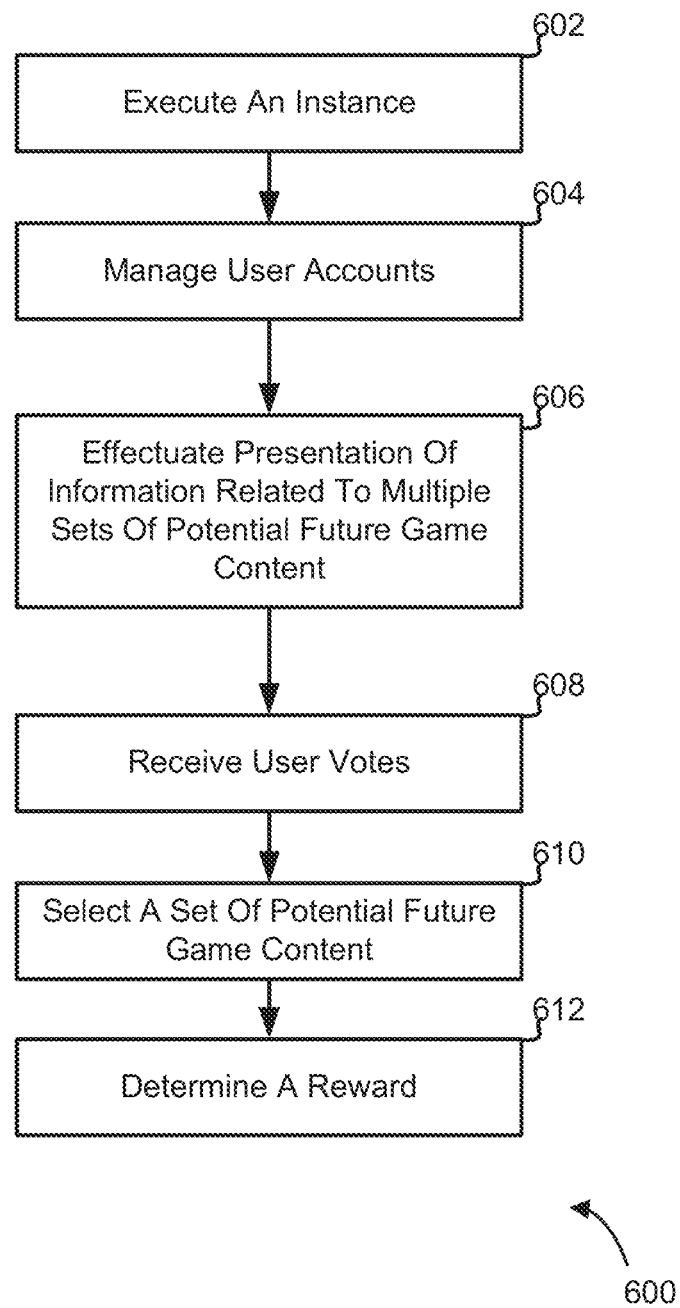
FIG. 6 illustrates one exemplary method 600 for facilitating user voting for potential future game content in an online game in accordance with the disclosure.

FIG. 6 illustrates one exemplary method 600 for facilitating user voting for potential future game content in an online game in accordance with the disclosure. The operations of method 600 presented below are intended to be illustrative. In some embodiments, method 600 may be accomplished with one or more additional operations not described, and/or without one or more of the operations discussed. Additionally, the order in which the operations of method 600 illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/ or software to be specifically designed for execution of one or more of the operations of method 600.

At an operation 602, an instance of an online game may be executed and implemented to determine view information for transmission to one or more client computing platforms associated with users. The instance of online game may facilitate user interaction within the online game by receiving user commands from client computing platforms associated with the users of the online game. Within the instance of the online game executed by game component, the users may participate in the instance of the virtual space by controlling one or more of an element in the virtual space. In some implementations, operation 602 may be performed by a game component the same as or similar to game component 112 (shown in FIG. 1 and described herein).

At an operation 604, user accounts associated with the users may be managed. The user account associated with a given user as managed by the user component may comprise one or more user parameters related to the given user. The one or more user parameters may include a voting power parameter and/or any other parameter(s). For the given user, a value of the voting power parameter may reflect an amount of voting power associated with the given user in the online game. The voting power may be used or consumed by the given user, for example, for voting for potential future game content and/or any for any other purposes in the online game. The value of the voting power parameter may be determined based on gameplay, in-game purchase, and/or any other actions related to the online game undertaken by the given user. In some examples, voting power may be earned by the given user in the online for engaging in gameplays, actions, activities, events and/or any other deeds desired by provider, administrator, moderator, and/or any other entities related to the online game. The user accounts managed by the user component may include a first user account associated with a first user. The first user account may comprise a voting power parameter having a value reflecting an amount of voting power associated with the first user in the online game. In some implementations, operation 604 may be performed by a user component the same as or similar to user component 114 (shown in FIG. 1 and described herein).

At operation 606, presentation of information related to multiple different sets of potential future game content for the online game to users of the online game may be effectuated. A given set of potential future game content presented may include game features, game mechanics, characters, plots, virtual items, difficulty level, quests, missions, campaign, maps, virtual areas for interaction and/or any other types of game content that may be provided in the online game at a future time. In some implementations, operation 606 may be performed by a potential future game content component the same as or similar to potential future game content component 116 (shown in FIG. 1 and described herein).

At an operation 608, user votes for individual ones of the sets of potential future game content may be received. A user vote for a potential future game content may be received from the client computing platform associated with a user. The received user vote may cost an amount of voting power associated with the user as reflected by the voting power parameter for the user. In some implementations, operation 608 may be performed by a user vote component the same as or similar to user vote component 118 (shown in FIG. 1 and described herein).

At an operation 610, one or more sets of potential future game content may be selected based on the user votes received in operation 608. This may involve tallying the received user votes. In some examples, the selection by the future game content selection component include determining the highest number of user votes received for a set of potential future game content as compared to user votes received for other sets of potential future game content. In some implementations, operation 610 may be performed by future game content selection component the same as or similar to future game content selection component 120 (shown in FIG. 1 and described herein).

At an operation 612, rewards may be determined for distribution to users based on the user voting for the potential future game content. The reward determination by operation 612 may be based on a set of future potential game content voted by a given user being selected by the future game content selection component. In some examples, the size or magnitude of a reward determined by the reward component for a given user may be based on a quantity of votes allocated by the given user to the set of future potential game content, and/or based on any other parameters. In some examples, the reward determination by the reward component may be based on a voting milestone being breached by the given user. In some implementations, operation 612 may be performed by a reward component the same as or similar to reward component 122 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for gauging user interest in new content for an online game, the system comprising:
    one or more physical processors configured by machine-readable instructions to:
        execute an instance of an online game, and to use the instance of the online game to generate state information that is transmitted to client computing platforms associated with users over a network, the game state information facilitating presentation of views of the online game to the users via the client computing platforms, wherein execution of the instance of the online game further enables participation of the users with at least one of the online game or each other by performing operations in the game instance in response to commands received over the network from the client computing platforms associated with the users;
        manage user accounts associated with individual users, the user accounts comprising user parameters related to the individual users such that the user accounts include a first user account associated with a first user and a second account associated with a second user, the first user account indicating a value of a user voting power parameter for the first user and the second user account indicating a second value of a second user voting power parameter for the second user;
        effectuate presentation to the users of information related to multiple different sets of potential future game content for the online game, the sets of potential future game content including a first set of potential future game content and a second set of potential future game content;
        receive at least one of entry or selection of user votes for individual ones of the sets of potential future game content, wherein a user vote by the first user costs the first user an amount of the user voting power parameter and wherein a second user vote by the second user costs the second user an amount of the second user voting power parameter, and wherein the first user vote is for the first set of potential future game content and the second user vote is for the second set of potential future game content; and
        select the first set of potential future game content as a set of potential future game content to provide in the online game, wherein the first set of potential future game content is selected from the sets of potential future game content based on the received user votes;
        determine rewards for distribution to a portion of the individual users that voted for the set of potential future game content selected based on the received user votes, wherein a first reward is determined to be at least a portion of the first set of potential future game content, wherein the first reward is further determined to be distributed to the portion of the individual users including the first user by virtue of the portion of the individual users voting for the first set of future potential game content and the first set of future potential game content being selected based on the received user votes; and
        distribute the rewards by effectuating transmission of information indicating the first reward to the client computing platforms associated with the portion of the individual users including the first user, wherein the first reward is distributed to the first user by virtue of the first user voting for the first set of potential future game content but not to the second user by virtue of the second user not voting for the first set of future potential game content.

2. The system of claim 1, wherein the one or more physical processors are further configured to enable the users to allocate individual quantities of the user votes to the individual ones of the sets of potential future game content presented to the users such that the first user is enabled to allocate a first quantity of the user votes to the first set of potential future game content and a second quantity of the user votes to the second set of potential future game content.

3. The system of claim 1, wherein the determination of the first reward for distribution to the first user is based on a number of the user votes by the first user for the set of future potential game content that is selected.

4. The system of claim 1, wherein the first reward includes at least one of: one or more virtual items, or one or more virtual resources usable in the virtual space.

5. The system of claim 1, wherein the physical processors are further configured to determine that voting by the first user for potential future game content has breached a voting milestone, and to determine a reward for distribution to the first user based on the voting milestone has been breached by the first user.

6. The system of claim 5, wherein the voting milestone specifies a threshold number of voting for potential future game content to be performed by the first user.

7. The system of claim 1, wherein the gameplay based on which the value of the voting power is determined includes at least one of: virtual troop training, building upgrade, user character development, interaction with the other users in the virtual space or interaction with the virtual space by the first user.

8. The system of claim 1, wherein the value of the user voting power parameter for the first user is further determined based on in-game purchase made by the first user.

9. A method for gauging user interest in new content for an online game, the method being implemented in one or more physical processors configured to execute computer programs, the method comprising:

executing an instance of an online game, and using the instance of the online game to generate state information that is transmitted to client computing platforms associated with users over a network, the game state information facilitating presentation of views of the online game to the users via the client computing platforms, wherein execution of the instance of the online game further enables participation of the users with at least one of the online game or each other by performing operations in the game instance in response to commands received over the network from the client computing platforms associated with the users;

managing user accounts associated with individual users, the user accounts comprising user parameters related to the individual users such that the user accounts include a first user account associated with a first user and a second account associated with a second user, the first user account indicating a value of a user voting power parameter for the first user and the second user account indicating a second value of a second user voting power parameter for the second user;

effectuating presentation to the users of information related to multiple different sets of potential future game content for the online game, the sets of potential future game content including a first set of potential future game content and a second set of potential future game content;

receiving at least one of entry or selection of user votes for individual ones of the sets of potential future game content, wherein a user vote by the first user costs the first user an amount of the user voting power parameter and wherein a second user vote by the second user costs the second user an amount of the second user voting power parameter, and wherein the first user vote is for the first set of potential future game content and the second user vote is for the second set of potential future game content; and selecting the first set of potential future game content as a set of potential future game content to provide in the online game, wherein the first set of potential future game content is selected from the sets of potential future game content based on the received user votes;

determining rewards for distribution to a portion of individual users that voted for the set of potential future game content selected based on the received user votes, wherein a first reward is determined to be at least a portion of the first set of potential future game content, wherein the first reward is further determined to be distributed to the portion of the individual users including the first user by virtue of the portion of the individual users voting for the first set of future potential game content and the first set of future potential game content being selected based on the received user votes; and distributing the rewards by effectuating transmission of information indicating the first reward to the client computing platforms associated with the portion of the individual users including the first user, wherein the first reward is distributed to the first user by virtue of the first user voting for the first set of potential future game content but not to the second user by virtue of the second user not voting for the first set of future potential game content.

10. The method of claim 9, further comprising enabling the users to allocate individual quantities of the user votes to the individual ones of the sets of potential future game content presented to the users such that the first user is enabled to allocate a first quantity of the user votes to the first set of potential future game content and a second quantity of the user votes to the second set of potential future game content.

11. The method of claim 9, wherein the determination of the first reward for distribution to the first user is based on a number of the user votes by the first user for the set of future potential game content that is selected.

12. The method of claim 9, wherein the first reward includes at least one of: one or more virtual items, or one or more virtual resources usable in the virtual space.

13. The method of claim 9, further comprising determining voting by the first user for potential future game content has breached a voting milestone and to determine a reward for distribution to the first user based on the voting milestone has been breached by the first user.

14. The method of claim 13, wherein the voting milestone specifies a threshold number of voting for potential future game content to be performed by the first user.

15. The method of claim 9, wherein the gameplay based on which the value of the voting power is determined includes at least one of: virtual troop training, building upgrade, user character development, interaction with the other users in the virtual space or interaction with the virtual space by the first user.

16. The method of claim 9, wherein the value of the user voting power parameter for the first user is further determined based on in-game purchase made by the first user.

* * * * *